(12) United States Patent
Lee et al.

(10) Patent No.: US 10,595,025 B2
(45) Date of Patent: Mar. 17, 2020

(54) VIDEO CODING

(71) Applicant: Microsoft Technology Licensing, LLC, Redmond, WA (US)

(72) Inventors: Ming-Chieh Lee, Bellevue, WA (US); Amy Lu, Bellevue, WA (US); Pontus Carlsson, Bromma (SE); Mattias Dan Nilsson, Sundbyberg (SE); Sergey Sablin, Bromma (SE); Sergey Silkin, Nacka (SE); David Yuheng Zhao, Enebyberg (SE); Magnus Hemmendorff, Stockholm (SE); Sergei Nikiforov, Stockholm (SE)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 817 days.

(21) Appl. No.: 14/847,375

(22) Filed: Sep. 8, 2015

(65) Prior Publication Data

US 2017/0070738 A1    Mar. 9, 2017

(51) Int. Cl.
*H04N 19/164* (2014.01)
*H04L 29/06* (2006.01)
(Continued)

(52) U.S. Cl.
CPC ......... *H04N 19/164* (2014.11); *H04L 1/0014* (2013.01); *H04L 1/1635* (2013.01);
(Continued)

(58) Field of Classification Search
CPC ......... H04N 21/2541; H04N 21/25875; H04N 21/4627; H04N 19/164; H04N 19/105;
(Continued)

(56) References Cited

U.S. PATENT DOCUMENTS 5,608,450 A    3/1997  Agarwal et al.
6,249,318 B1   6/2001  Girod et al.
(Continued)

FOREIGN PATENT DOCUMENTS

| EP | 0763944 | 3/1997 |
|----|---------|--------|
| EP | 0902593 | 3/1999 |
| WO | WO-2013033676 | 3/2013 |

OTHER PUBLICATIONS

"International Search Report and Written Opinion", Application No. PCT/US2016/050592, dated Nov. 21, 2016, 15 pages.
(Continued)

*Primary Examiner* — James R Sheleheda
*Assistant Examiner* — Franklin S Andramuno
(74) *Attorney, Agent, or Firm* — NovoTechIP International PLLC

(57) ABSTRACT

A transmitting device for generating a plurality of encoded portions of a video to be transmitted to a receiving device over a network configured to: receive an error message over a feedback channel from the receiving device indicating at least one of said plurality of encoded portions that has been lost at the receiving device; encode a recovery portion responsive to said receiving said error message; and transmit said recovery portion to the receiving device over said network; wherein said error message includes information pertaining to a decoded portion successfully decoded at the receiving device and said recovery portion is encoded relative to said decoded portion.

20 Claims, 6 Drawing Sheets

(51) Int. Cl.

| | |
|---|---|
| *H04N 19/105* | (2014.01) |
| *H04N 19/58* | (2014.01) |
| *H04N 19/65* | (2014.01) |
| *H04L 12/18* | (2006.01) |
| *H04N 21/6375* | (2011.01) |
| *H04L 1/16* | (2006.01) |
| *H04L 1/18* | (2006.01) |
| *H04L 1/00* | (2006.01) |
| *H04N 19/573* | (2014.01) |
| *H04N 19/172* | (2014.01) |
| *H04N 21/6405* | (2011.01) |
| *H04N 19/174* | (2014.01) |

(52) U.S. Cl.
CPC .......... *H04L 1/1835* (2013.01); *H04L 1/1838* (2013.01); *H04L 1/1877* (2013.01); *H04L 12/1868* (2013.01); *H04L 65/607* (2013.01); *H04N 19/105* (2014.11); *H04N 19/172* (2014.11); *H04N 19/174* (2014.11); *H04N 19/573* (2014.11); *H04N 19/58* (2014.11); *H04N 19/65* (2014.11); *H04N 21/6375* (2013.01); *H04N 21/6405* (2013.01); *H04L 2001/0093* (2013.01)

(58) Field of Classification Search
CPC .. H04N 19/172; H04N 19/174; H04N 19/573; H04N 19/58; H04N 19/65; H04L 1/0014; H04L 1/1635
USPC ............................................ 725/93, 116, 143
See application file for complete search history.

(56) References Cited

U.S. PATENT DOCUMENTS

| | | | |
|---|---|---|---|
| 6,810,377 | B1 | 10/2004 | Ho et al. |
| 8,259,802 | B2 | 9/2012 | Mulroy et al. |
| 8,265,145 | B1 | 9/2012 | Pejhan et al. |
| 8,494,049 | B2 | 7/2013 | Buttimer et al. |
| 8,634,413 | B2 | 1/2014 | Lin et al. |
| 2005/0008240 | A1 | 1/2005 | Banerji et al. |
| 2006/0013318 | A1 | 1/2006 | Webb et al. |
| 2006/0133514 | A1 | 6/2006 | Walker |
| 2008/0095246 | A1 | 4/2008 | Luo et al. |
| 2008/0247463 | A1 | 10/2008 | Buttimer et al. |
| 2009/0052531 | A1 | 2/2009 | Mulroy et al. |
| 2009/0097555 | A1 | 4/2009 | Baillavoine et al. |
| 2009/0138933 | A1 | 5/2009 | Baillavoine et al. |
| 2009/0252227 | A1 | 10/2009 | NepomucenoLeung et al. |
| 2010/0312552 | A1* | 12/2010 | Zheng .................. H04L 1/0009 704/219 |
| 2011/0069756 | A1 | 3/2011 | Matthews |
| 2011/0085602 | A1 | 4/2011 | He |
| 2011/0249729 | A1 | 10/2011 | Zhou et al. |
| 2012/0079329 | A1 | 3/2012 | Steinbach et al. |
| 2012/0170654 | A1 | 7/2012 | Zhang et al. |
| 2012/0327997 | A1 | 12/2012 | Nilsson et al. |
| 2013/0058395 | A1 | 3/2013 | Nilsson |
| 2013/0058405 | A1 | 3/2013 | Zhao et al. |
| 2013/0142257 | A1 | 6/2013 | Wang et al. |
| 2013/0263201 | A1 | 10/2013 | Chung-How et al. |
| 2013/0279606 | A1 | 10/2013 | Rahul et al. |
| 2014/0119204 | A1 | 5/2014 | Guo et al. |
| 2014/0211860 | A1 | 7/2014 | Zhao et al. |
| 2014/0218473 | A1 | 8/2014 | Hannuksela et al. |
| 2014/0269918 | A1 | 9/2014 | van der Laan |
| 2014/0307771 | A1 | 10/2014 | Hemmendorff et al. |
| 2015/0156487 | A1 | 6/2015 | Tao et al. |
| 2016/0056927 | A1 | 2/2016 | Liu et al. |
| 2016/0198161 | A1 | 7/2016 | Samuelsson et al. |
| 2017/0070739 | A1 | 3/2017 | Lee et al. |

OTHER PUBLICATIONS

"International Search Report and Written Opinion", Application No. PCT/US2016/050593, dated Nov. 18, 2016, 18 pages.

"Video coding for low bit rate communication", ITU-T Recommendation H.263, Feb. 1998, 167 pages.

Apostolopoulos,"Error-Resilient Video Compression Through the Use of Multiple States", In Proceedings of International Conference on Image Processing, Proceedings, vol. 3, Sep. 10, 2000, 4 pages.

Apostolopoulos,"Reliable video Communication over Lossy Packet Networks using Multiple State Encoding and Path Diversity", In Proceedings of Visual Communications and Image Processing Available at: <http://www.hpl.hp.com/techreports/2001/HPL-2001-319.pdf>, Jan. 20, 2001, 19 pages.

Fukunaga,"Error Resilient Video Coding Controlled by Backward Channel Signaling", May 1, 1999, pp. 531-540.

Girod,"Feedback-Based Error Control for Mobile Video transmission", Proceedings of the IEEE, 87 (10), Oct. 1999, 17 Pages.

Haratcherev,"Optimized Video Streaming over 802.11 by Cross-Layer Signaling", In IEEE Communications Magazine, vol. 44, Issue 1, Jan. 2006, 7 pages.

Paul,"A Long Term Reference Frame for Hierarchical B-Picture-Based Video Coding", In Proceedings: In IEEE Transactions on Circuits and Systems for Video Technology, Oct. 2014, 14 pages.

Wang,"Error Resilient Video Coding Using Flexible Reference Frames", Visual Communications and Image Processing, Jul. 12, 2005, 12 pages.

Wang, et al., "RTP Payload Format for High Efficiency Video Coding", Published on: Jun. 3, 2015, Available at: https://tools.ietf.org/html/draft-ietf-payload-rtp-h265-13.

Ott, et al., "Extended RTP Profile for Real-time Transport Control Protocol (RTCP)-Based Feedback (RTP/AVPF)", Published on: Jul. 2006, Available at: https://tools.ietf.org/html/rfc4585#section-6.3.1.

"Cisco Video and TelePresence Architecture Design Guide", Published on: Mar. 30, 2012, Available at: http://www.cisco.com/c/en/us/td/docs/voice_ip_comm/uc_system/design/guides/videodg/vidguide.pdf.

"International Preliminary Report on Patentability Issued in PCT Application No. PCT/US2016/050593", dated Nov. 27, 2017, 13 Pages.

Ma, Di, "Secure Feedback Service in Wireless Sensor Networks", In Proceedings of Third International Conference on Information Security Practice and Experience, May 7, 2007, pp. 116-128.

"Second Written Opinion Issued in PCT Application No. PCT/US2016/050593", dated Aug. 23, 2017, 9 Pages.

"Second Written Opinion Issued in PCT Application No. PCT/US2016/050592", dated Aug. 23, 2017, 6 Pages.

"Non-Final Office Action", U.S. Appl. No. 14/847,318, dated Nov. 2, 2017, 15 pages.

"International Preliminary Report on Patentability", Application No. PCT/US2016/050592, dated Nov. 27, 2017, 8 pages.

* cited by examiner

VIDEO CODING

BACKGROUND

A stream of video data to be encoded is illustrated schematically in FIG. 1. The stream comprises multiple frames (F) 101, 102, 103 each representing the video image at a different respective moment in time. As will be familiar to a person skilled in the art, for the purpose of encoding, each frame (F) 101, 102, 103 is divided into portions and each portion may also be subdivided into smaller sub-portions, each portion or sub-portion comprising a plurality of pixels. For example, according to one terminology each frame of a video stream to be encoded is divided into macroblocks (MB) 104 comprising multiple pixels (e.g. each macroblock 104 may be a region of 8×8 pixels.

An encoder at a transmitter encodes the video data for transmission to a receiver over a packet-based network. A decoder at the receiver is then able to decode the encoded video data. The general term for the encoding/decoding method employed is a codec.

In some systems, the decoder at the receiver may be arranged to send feedback to the encoder of the transmitter via a feedback channel, via the same packet-based network.

A goal of a video codec is to reduce the bit rate needed to transmit a video signal, while maintaining highest possible quality. This goal is achieved by exploiting statistical redundancies (similarities in the video signal) and perceptual irrelevancies (related to sensitivity of human visual system).

Most of today's video codecs are based on an architecture that includes prediction of pixel blocks from other pixel blocks, transform of prediction residuals, quantization of transform coefficients, and entropy coding of quantization indices. These steps contribute to reducing redundancies and irrelevancies.

The prediction can typically be performed from pixels in video frames other than the current frame (inter prediction) and from pixels in the same frame (intra prediction). That is, an intra-coded frame is encoded using only information in that frame itself. For example, spatial redundancies across the frame image can be exploited using known techniques such as a discrete cosine transform. Frames encoded in this way are referred to as I-frames.

An inter-encoded frame on the other hand is encoded using information from frames other than itself. That is, an inter-encoded frame may only indicate the differences between the frame and a previous frame. Hence an inter-encoded frame requires fewer bits to encode than encoding absolute pixel values and hence saves on bitrate. Inter-encoded frames may be referred to as P-frames (though other types of inter-encoded frames exist and are known in the art, only P-frames are referred to herein for the sake of clarity).

Intra prediction encoding typically requires more bits than inter prediction, though still represents a saving over encoding absolute values. Details of suitable inter and intra encoding techniques for video will be familiar to a person skilled in the art.

In a conventional system, the feedback channel may be used to enable the encoder on the transmitter to determine that a frame was experienced as lost at the receiver. There are two ways in which this may be achieved. Firstly, in a negative feedback scheme, the transmitter may signal back to the encoder on the transmitter that a frame was experienced as lost at the receiver (a loss report). Secondly, in a positive feedback scheme, the feedback channel may also be used to signal back to the encoder that a frame was successfully received at the receiver (an acknowledgement), thus the encoder may determine that a frame was lost at the receiver when it does not receive an acknowledgement. Typically, a lost frame causes severe distortions in the decoded video that can last for a long time unless actions are taken. One such action is to force the encoder to generate a "recovery frame" that will stop error propagation when received and decoded.

A frame may be deemed "lost" at the receiver when it is not successfully received and/or not successfully decoded by the receiver. Hence, a frame may be "lost" at the receiver due to packet loss on the network. Alternatively, a frame may be "lost" at the receiver due to corruption of frame data (i.e. the frame was received by the receiver, but the received frame contains data errors which result in it not being decodable), and the corruption cannot be corrected using error correction. In general, a frame (or more generally a portion) may be considered lost at the receiver if it has not been both received and decoded at the receiver.

In a negative feedback scheme the recovery frame is a key-frame (i.e. all intra coded).

In a positive feedback scheme, the encoder is informed of every successfully received frame and hence has information pertaining to the last frame successfully decoded by the decoder. Hence, in this scheme the recovery frame may also be a frame that is inter coded with respect to an error-free frame known to be available in the decoder (known to be error free because it has itself been acknowledged as received and anything else relevant in its history has been acknowledged). The latter generally results in a lower bitrate at a given quality compared to the former. The disadvantages associated with sending a recovery frame are bitrate overshoots (rate spikes) or alternatively an increase in source coding distortion. Bitrate overshoots can in turn cause new losses or forcing encoder to drop frames and a drastic increase source coding distortion might be perceptually disturbing.

SUMMARY

As mentioned, the feedback channel may be used for example to signal that a frame was lost at the receiver. Typically, a lost frame causes severe distortions in the decoded video that can last for a long time unless actions are taken.

The present embodiments recognize that it would be advantageous to be able to enable recovery in a negative feedback scheme without the need to send a fully intra-coded key-frame.

To alleviate the aforementioned problem, the present embodiments provide a transmitting device for generating a plurality of encoded portions of a video to be transmitted to a receiving device over a network configured to: receive an error message over a feedback channel from the receiving device indicating at least one of said plurality of encoded portions that has not been both received and decoded at the receiving device; encode a recovery portion responsive to said receiving said error message; and transmit said recovery portion to the receiving device over said network; wherein said error message includes information pertaining to a decoded portion successfully decodable from one of said encoded portions received and not rejected as corrupt at the receiving device and said recovery portion is encoded relative to said decoded portion.

The embodiments also provides a receiving device for receiving a plurality of encoded portions of a video from a transmitting device over a network configured to: generate an error message indicating at least one of said plurality of portions of a video that has not been both received and decoded at the receiving device; transmit said error message over a feedback channel to the transmitting device; receive a recovery portion from the transmitting device over said network; wherein said error message includes information pertaining to a decoded portion successfully decodable from one of said encoded portions received and not rejected as corrupt at the receiving device and said recovery portion is encoded relative to said decoded portion.

The embodiments also provide a server for routing a plurality of encoded portions of a video over a network between a transmitting device and a plurality of receiving devices, the server comprising one or more server units being configured to: receive an error message over a feedback channel from at least two respective ones of the plurality of receiving devices, each respective error message including lost portion data indicating at least one of said plurality of encoded portions that has not been both received and decoded at the respective one of said plurality of receiving devices, and decoded portion data indicating a respective decoded portion successfully decodable from one of said encoded portions received and not rejected as corrupt at the respective one of said plurality of receiving devices; generate a collective error message based on the received error messages; transmit said collective error message to the transmitting device; receive a recovery portion from the transmitting device over said network; and transmit said recovery portion to said plurality of receiving devices. wherein: said collective error message includes an indication of a collective target portion being one of said plurality of encoded portions determined based on the lost portion data included in each respective one of the error messages, and a collective decoded portion determined based on the decoded portion data included in each one of the respective error messages; and said recovery portion comprises the collective target portion encoded relative to the collective decoded portion.

In embodiments, at least one of the plurality of encoded portions is marked for storage at the receiving device and said decoded portion is a decoded portion decoded from said at least one of the plurality of encoded portions.

In embodiments, at least one of the plurality of encoded portions is stored in a buffer at the receiving device and said decoded portion is a decoded portion decoded from said at least one of the plurality of encoded portions.

In embodiments, said decoded portion is a most recently decoded portion.

In embodiments, said plurality of encoded portions of a video are a plurality of encoded frames of the video.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted in the Background section.

BRIEF DESCRIPTION OF THE DRAWINGS

For a better understanding of the present embodiments and to show how they may be put into effect, reference is made by way of example to the accompanying drawings in which.

DETAILED DESCRIPTION

Figure 1:
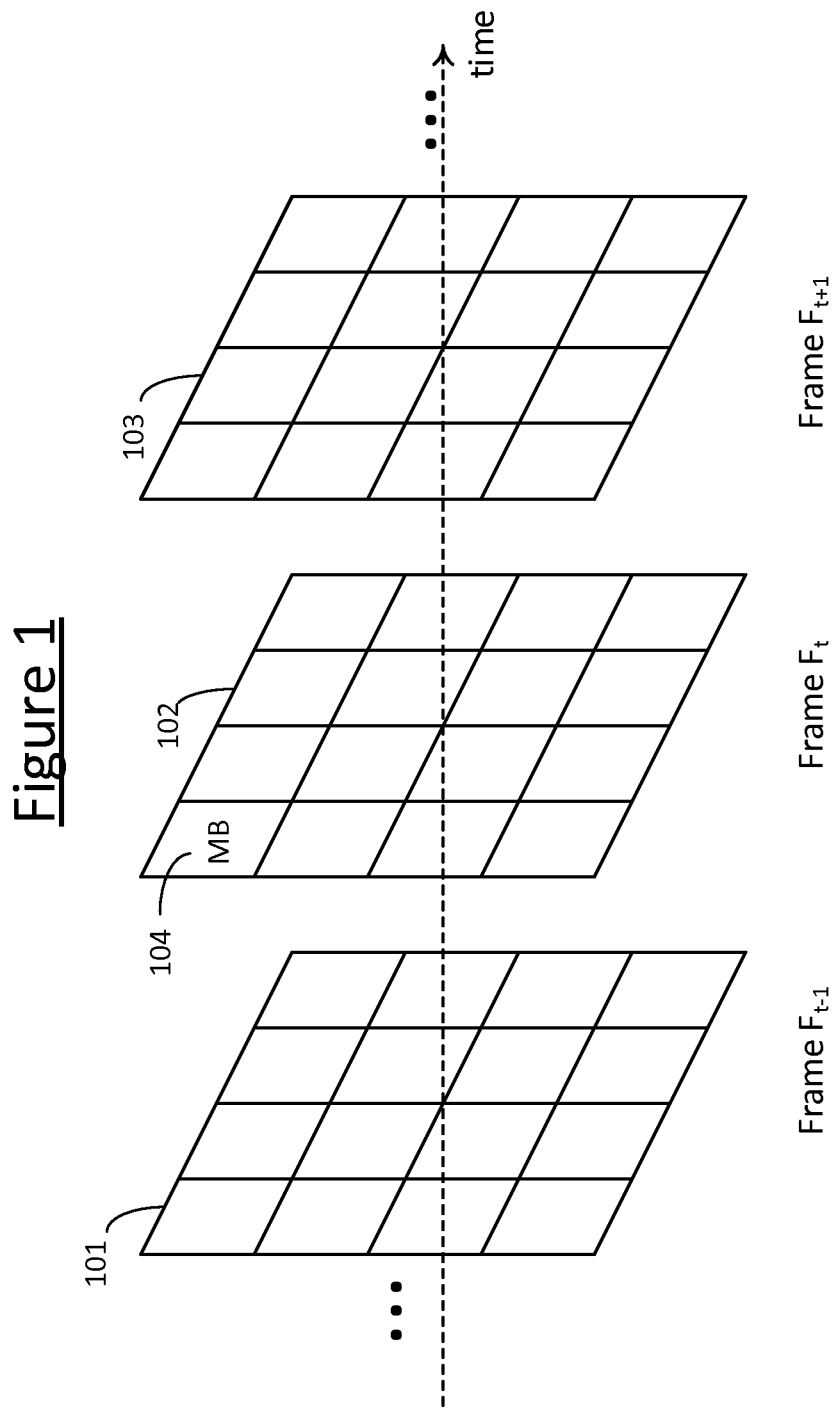
FIG. 1 is a schematic representation of a video stream.

As described above with reference to FIG. 1, in order to minimize bit rate for video, a video frame is typically encoded using a previous frame as a reference. With this coding schema, only the differences to the previous frame have to be transmitted. If a reference frame is lost (for instance due to packet loss) subsequent frame cannot be decoded correctly. A frame referring to a previous frame is called a P frame. The video may be, for example, a live video call, or a one-way video stream etc. The network may be any suitable network for transmitting video data using any suitable protocol, e.g. the network may be the internet.

Figure 2:
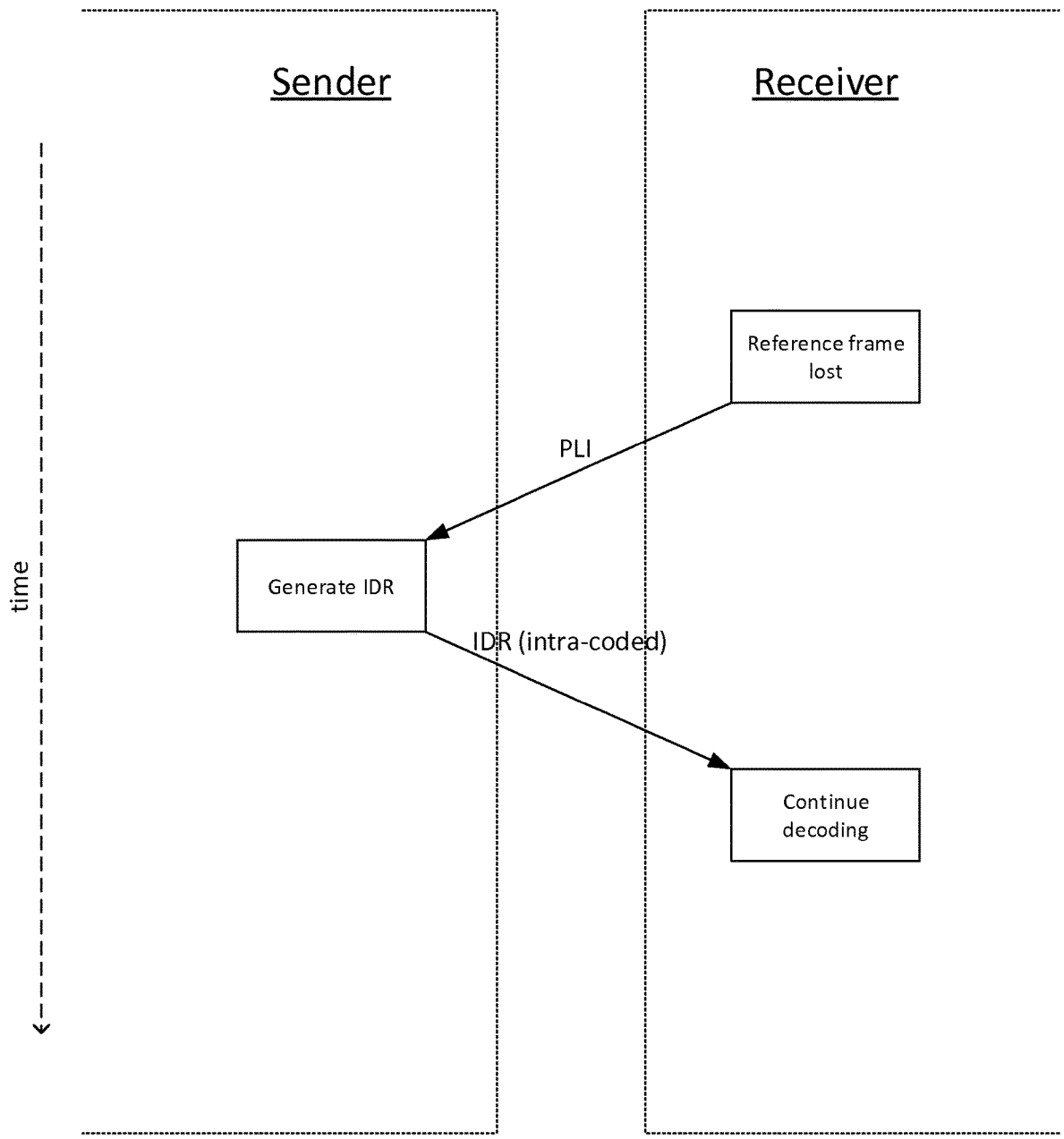
FIG. 2 illustrates a conventional method of frame loss recovery.

FIG. 2 illustrates conventional frame loss recovery in a negative feedback scheme. When the receiver discovers a reference frame loss, it transmits a Picture Loss Indication (PLI) to the sender. The sender reacts to this by transmitting an Instantaneous Decoding Refresh (IDR) frame. The receiver drops the corrupted reference frame and the subsequent ones before receiving an IDR picture (which causes video freeze). An IDR picture is an independently encoded frame, i.e. it does not refer to any previously encoded frames. Hence, this type of recovery is basically a video stream restart.

One drawback of this conventional frame loss recovery is that IDR frames consume significantly higher bit rate than P frames for the same level of quality. Or equivalently, IDR frames would have significantly lower quality at the same bit rate.

To address the above-outlined problem, the present embodiments introduce a schema using Long Term Reference (LTR) frames. Multiple frames can be stored at the receiver and an LTR frame is a frame that has been marked for storage at the receiver. Hence, if a reference frame is lost at the receiver, the receiver would still be able to decode a following frame if that would refer to a frame that was successfully decoded (i.e. a frame before the loss occurred). In this sense, a frame (or portion) before the loss occurred may be used as a reference provided the encoded frame was successfully received and not rejected as corrupt by the receiving device. A frame may be corrupted due to a variety of reasons known in the art.

Figure 3:
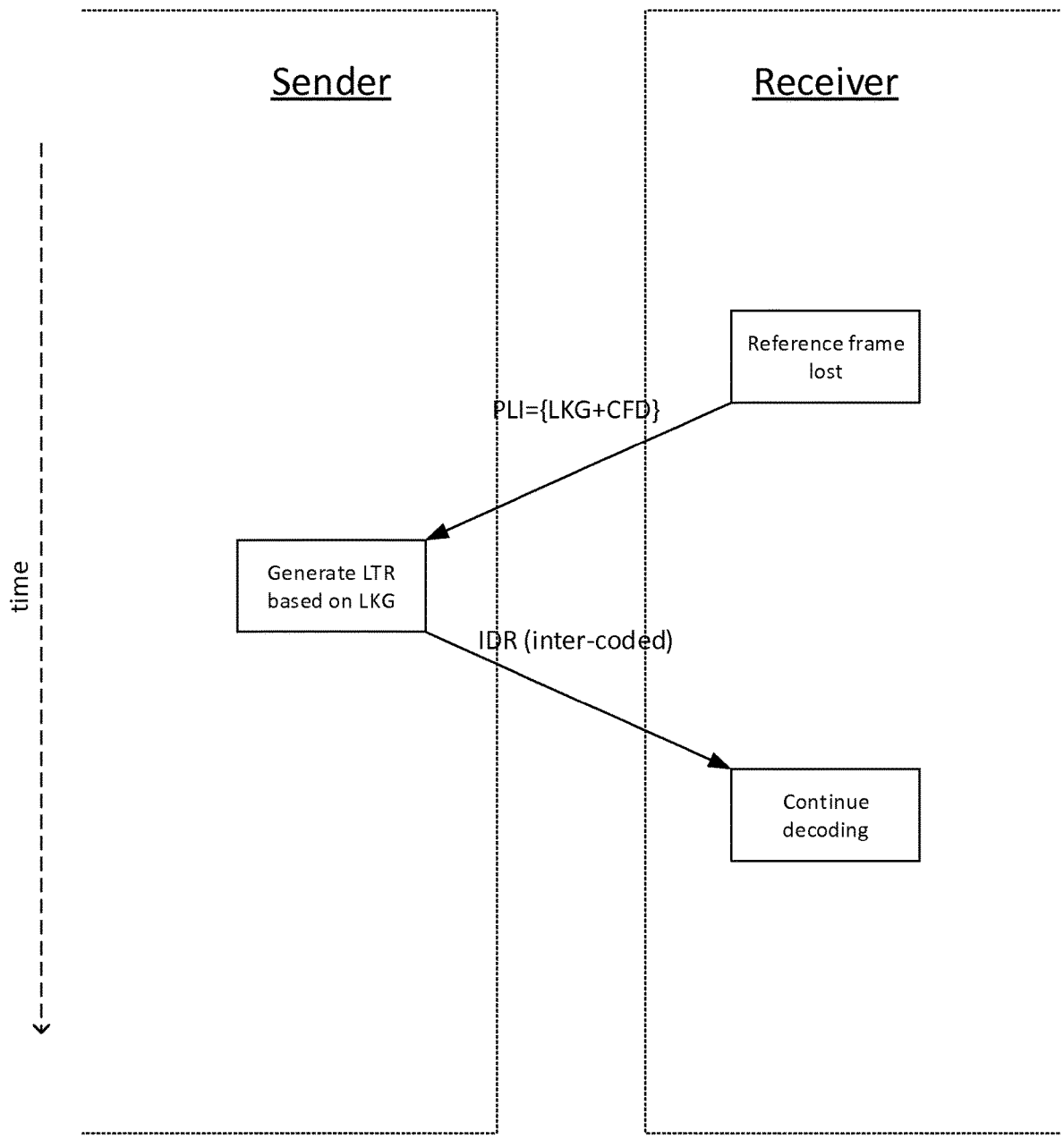
FIG. 3 illustrates frame loss recovery according to the present embodiments.

FIG. 3 illustrates frame loss recovery according to the present embodiments. As before, when the receiver discovers a reference frame loss, it transmits a PLI to the sender. In this case however, the PLI includes information pertaining to the Last Known Good frame (LKG) at the decoder and the Current Frame at Decoder (CFD). The LKG indicates the last frame which was successfully received and decoded by the decoder, but note that the LKG may in general refer to any successfully decoded frame (as described above) which is available at the decoder. Similarly, the CFD indicates the lost reference frame, but in general may indicate any current frame which the decoder wishes to decode. With the LKG information, the sender is able to encode a recovery frame which is the CFD encoded based on the LKG (i.e. the CFD inter-coded relative to the LKG). Transmission of this inter-coded recovery frame typically requires a significantly lower bitrate than the IDR of the prior art, because it is an inter-coded frame rather than an intra-coded frame. In general, the CFD may be regarded as the "target" frame and the LKG may be regarded as the "source" frame. That is, the CFD is the frame which the decoder requires, and the LKG is the frame relative to which the CFD is to be inter-encoded.

It should be understood that while the LKG is decoded at some point in time, it was not necessary for the LKG to have actually been decoded at the time that the PLI error message was sent. What matters is that the LKG is a frame (or portion) which was decodable. That is, a frame that can be known to be decodable when required. One example way of achieving this is an initial inspection of a packet (e.g. a checksum). This way, the receiver can determine whether or not a frame will be decodable before actually performing a full (e.g. H264) decoding. In this sense, the error message can contain information pertaining to a "decoded portion" even if the portion in question was not yet decoded at the time the error message was sent.

Reference is made herein to an indication of a frame. This may be an explicit frame number used to indicate a frame, but it does not have to be. In general, all that is needed is an identifier that is somehow connected with each piece of encoded data. For example, that identifier could be a packet sequence number (e.g. not compressed) or a hash of the entire packet.

Figure 4:
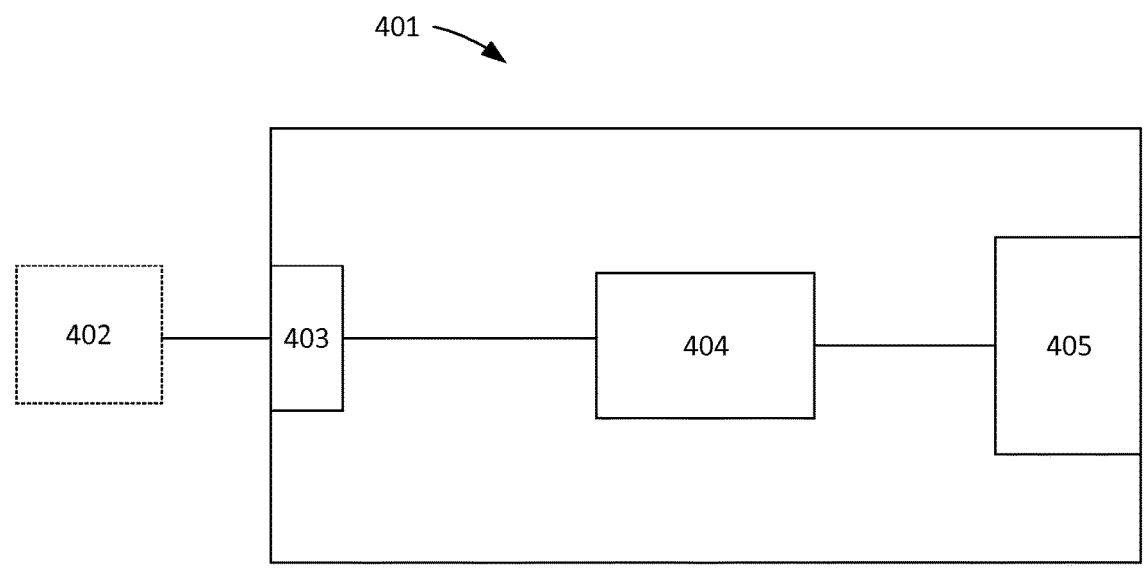
FIG. 4 shows a schematic of a transmitting device.

FIG. 4 shows a transmitter 401 according to the present embodiments. The transmitter 401 comprises an input 403 for receiving raw video data from a data source 402, an encoder 404 and a communications interface 405. The data source 402 may be any suitable source from which raw video data may be accessed by the transmitter 401. For example, the input 403 may be connected to a wired or wireless network over which raw video data may be accessed from an external source. Alternatively, the data source 402 may be a video camera which provides raw video data to the transmitter 401 via the input 403. For example, a webcam may provide raw video data to the transmitter 401 for encoding in a video call application scenario.

The input 403 is operatively connected to the encoder 404 and the encoder 404 is operatively coupled to the communications interface 405. In operation, the encoder 404 receives raw video data via the input 403 and encodes the raw video data and supplies it to the communications interface 405. As outlined above, video data encoding mechanisms are known and not described again here.

The communications interface 405 is arranged to transmit the encoded video data over a network. The network may be any suitable wired or wireless network (e.g. the internet).

Figure 5:
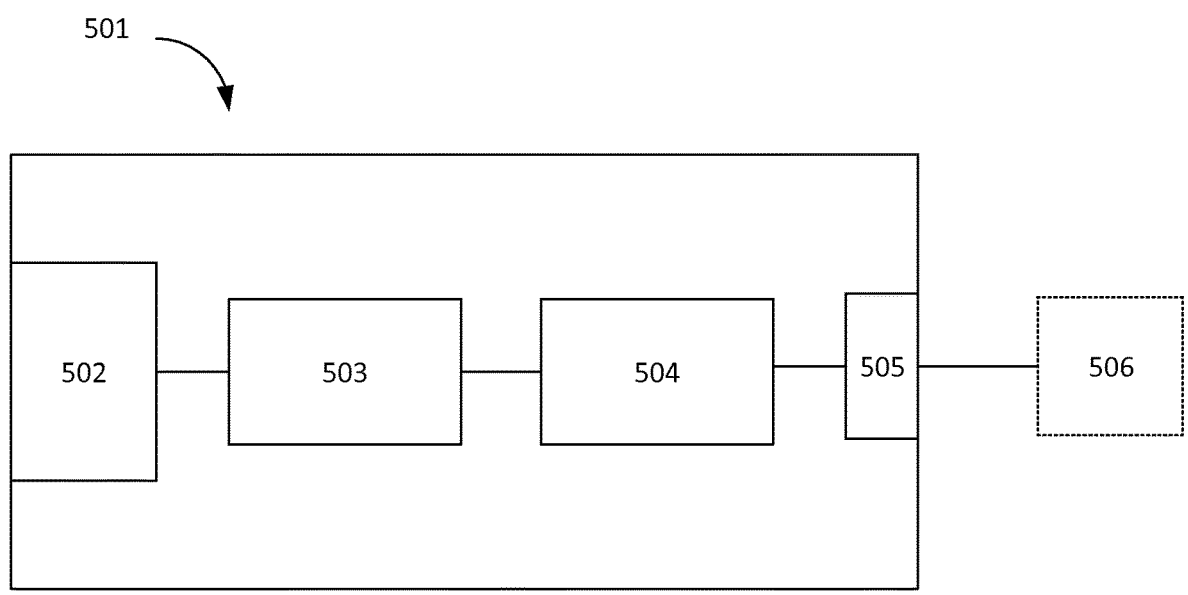
FIG. 5 shows a schematic of a receiving device.

FIG. 5 illustrates a receiver 501 according to the present embodiments. The receiver 501 comprises a communications interface 502, a buffer 503, a decoder 504 and an output 505. The communications interface 502 is operatively coupled to the buffer 503. The buffer 503 is operatively coupled to the decoder 504. The decoder 504 is operatively coupled to the output 505.

The communications interface 502 is arranged to receive encoded video data from the transmitter 401 over the network and supply the encoded video data to the buffer 503. The buffer 503 stores encoded video data ready to be decoded by the decoder 504. The decoder 504 takes encoded video data from the buffer 503, decodes the encoded video data and supplies it to the output 505.

The output 505 is arranged to output the decoded video data to a video playing device 506 which may be any suitable video player which is capable of interpreting the decoded video data and outputting the video.

If a reference frame is lost at the receiver 501, the receiver 501 transmits a Packet Loss Indication (PLI) to the transmitter via a feedback channel. The feedback channel may be the same network as the "primary" network between the communications interface 405 of the transmitter 401 and the communications interface 502 of the receiver 501. However, this is not a requirement; the feedback channel may be provided by an additional network between the transmitter 401 and receiver 501. This additional network may coincide partially or entirely with the primary network transmitting the encoded video data.

As described earlier, the PLI includes information pertaining to the Last Known Good frame (LKG) at the decoder and the Current Frame at Decoder (CFD). That is, the PLI informs the transmitter of two things: (1) which reference frame that has been lost at the decoder; (2) the most recent frame which the decoder successfully decoded. Hence, the PLI enables the transmitter to encode the CFD as an inter-encoded recovery frame relative to the LKG and transmit this recovery frame to the receiver. The receiver is then able to use this recovery frame to construct the missing frame. I.e. the receiver was missing a reference frame, and the recovery frame allows this missing frame to be constructed based on the LKG.

In general, the LKG may be indeed be any frame which was successfully decoded at the receiver, and may not necessarily be the most recently In order for the transmitter to encode an inter-encoded recovery frame relative to the LKG, the transmitter requires access to the LKG frame. This may be achieved in a variety of ways. Firstly, it is possible for the LKG frame to be explicitly sent by the receiver via the feedback channel, but this may require a large bit rate. An alternative is for the transmitter to (temporarily) store frames (e.g. in local memory). In this case the transmitter is then able to access the LKG from memory and use this stored frame to generate the recovery frame.

Similarly, in order for the receiver to reconstruct the recovery frame (which is inter-coded with respect to the LKG), the receiver requires access to the LKG. As mentioned above, the present embodiments may use Long Term Reference frames (LTR frames) which are frames marked for storage at the receiver. In this case, the receiver locally stores the LTR frames in an LTR buffer. This storage may be temporary. For example, the LTR buffer may contain only a specific number of LTR frames and discard the oldest LTR frame when a new LTR frame is stored. In these embodiments, the LKG is an LTR frame, e.g. the most recently stored LTR frame.

The above embodiments have been described with reference to an arrangement involving a single transmitter and single receiver communicating over a network. However, the present embodiments also apply generally in a conferencing scenario in which video streams are distributed to multiple receivers. For example, a server (e.g. a conference server) implemented in the system may aggregate PLIs sent from a plurality of receivers to limit the frequency of recovery frame requests at the transmitter.

As used herein, the term "aggregate" is used to refer to the process by which the server may generate a single PLI from the multiple PLIs received from the receivers. That is, the server considers the multiple received PLIs and determines a single, new, PLI to forward to the transmitter via a feedback channel. In this sense, the single PLI determined by the server is a "collective" PLI.

Figure 6:
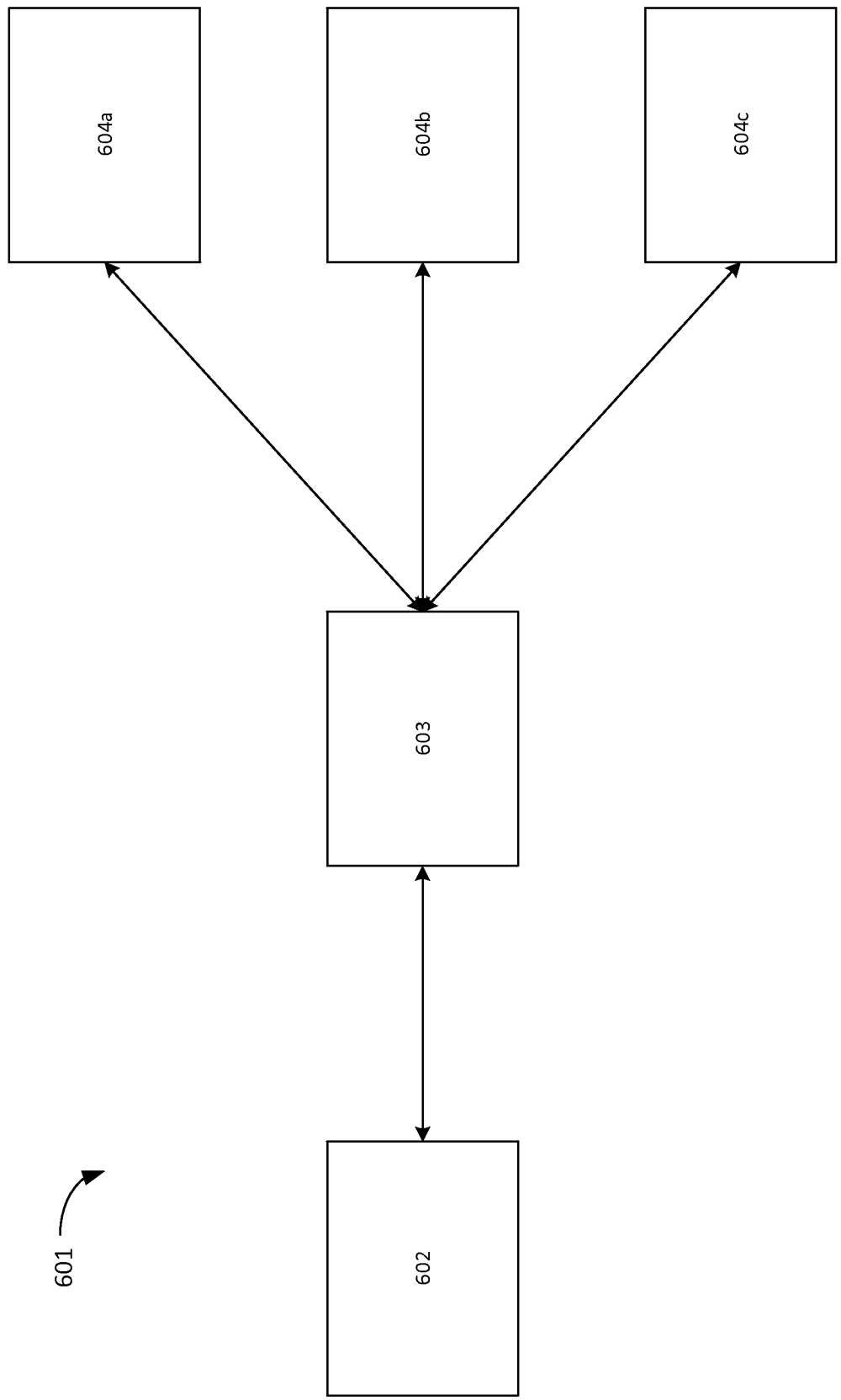
FIG. 6 illustrates a system implementing a conferencing scenario according to the present embodiments.

FIG. 6 illustrates a system 601 implementing a conferencing scenario according to the present embodiments. The system 601 comprises a transmitter 602, a server 603 (such as a conferencing server, CS), and a plurality of receivers 604a, 604b, 604c. The transmitter 602 is operatively coupled to the server 603. The server 603 is operatively coupled to each of the receivers 604a, 604b, 604c. Note that in a video conferencing setting, each transmitter may also act a receiver (and vice-versa). Hence, each of the receivers 604a, 604b, 604c may also be outputting an encoded video stream of their own. For clarity, FIG. 6 considers only a single video stream from a single transmitter 602 which is provided, via server 603 to a plurality of receivers 604a, 604b, 604c. However, it is understood that multiple, overlapping, instances of the system illustrated in FIG. 6 may be implemented at the same time over a network.

As with earlier embodiments, the transmitter 602 is arranged to encode and output a video stream over a network. In this case, however, the encoded video stream is output to server 603 which in turn outputs an instance of the encoded video stream to each of a plurality of receivers 604a, 604b, 604c. Each of the receivers 604a, 604b, 604c is also arranged to provide feedback to the server 603 via a respective feedback channel. FIG. 6 shows the feedback channels as using the same network, but it is appreciated that separate feedback channels may be implemented in a similar fashion to earlier embodiments. The server 603 is also arranged to provide feedback to the transmitter 602 via a feedback channel which, again, may be part of the same network or may be a separate dedicated feedback channel.

When receiver 604a detects a frame loss, it will send a PLI to the server 603 (and similarly for the other receivers 604b, 604c). The server 603 then requests a recovery of the stream from the transmitter 602 as per earlier embodiments. However, in the conferencing scenario with multiple receivers 604a, 604b, 604c, the transmitter 602 would receive separate recovery requests from each of the receivers 604a, 604b, 604c, greatly increasing the number of recovery frames the transmitter 602 would need to generate. This runs a risk of overloading the transmitter 602. Hence, the present embodiments provide a server 603 arranged to aggregate PLIs from the different receivers 604a, 604b, 604c and transmit recovery requests at a limited rate (e.g. maximum once per second). Hence, if during the one second interval the server 603 receives multiple PLIs related to the same transmitter 602, only one PLI will be transmitted to the transmitter 602.

In conventional systems implementing a conferencing scenario, each receiver requests a recovery frame from the transmitter and the recovery frame is an intra-encoded frame which does not reference any other fame. In this case the viability of the recovery frame does not rely on the availability of any frame at the receiver (i.e. the decodability of the intra-coded recovery frame is assured). Hence, the aggregation logic implemented at the server can be straight forward—delay and/or discard PLIs if they are identical. This is how some prior art systems operate (e.g. Microsoft Lync).

In the present embodiments, the recovery frames are inter-encoded relative to another frame available at the receiver. Hence, even if two receivers request the same frame, it is not sufficient to simply discard one PLI as then the transmitter may encode a recovery frame relative to a frame which is not available at one of the receivers.

In view of the above problem, the present embodiments provide aggregation logic which relies on additional information in the PLI: the Last Known Good (LKG) frame and the Current Frame at Decoder (CFD).

In this scheme, the server 603 is arranged to aggregate PLIs from the receivers 604a, 604b, 604c during a time period and then provide a single "aggregated" PLI to the transmitter 602 at the end of the time period. This process then repeats. Hence, requests for refresh frames at the transmitter 602 are limited to once per time period (for example, the time period may be one second).

Analogous to a standard PLI described above, an aggregated PLI includes information pertaining to an aggregated LKG frame and an aggregated CFD.

The aggregated LKG is calculated as MIN (receiver LKGs). That is, the aggregated LKG is equal to the minimum LKG received by the server 603 from any receiver 604a, 604b, 604c during the time period. The minimum LKG is the oldest (earliest generated) LKG across the receivers. That is, the minimum LKG is the oldest of the LKGs submitted by the receivers to the server.

The aggregated CFD is calculated as MAX (receiver CFDs). That is, the aggregated CFD is equal to the maximum CFD received by the server 603 from any receiver 604a, 604b, 604c during the time period. The maximum CFD is the newest (latest generated) CFD across the receivers. That is, the maximum CFD is the newest of the CFDs submitted by the receivers to the server.

These definition of the aggregated LKG and aggregated CFD maximises the number of reference frames not available to the encoder as it will invalidate reference frames in the range [LKG, CFD].

The CFD and LKG numbers are in general different for different receivers depending on loss patterns and channel delay. Hence, PLI aggregation is no longer "delay and/or discard" as in the prior art case. The recovery frame must use a reference that is available at all receivers. Therefore, if multiple PLIs are aggregated, the resulting single PLI should contain the oldest (minimum) LKG in order to ensure that the stream is recovered for all receivers.

The aggregated CFD is produced by taking the maximum CFD among the receiver PLIs. This may produce unnecessary recovery frames for the receivers that reported older CFDs as their loss may have been recovered by a frame between the older CFD and the most recent CFD. However, it is required to guarantee recovery for all receivers.

At the point the PLI reaches the transmitter, a frame that recovers the loss may already have been transmitted. Using the CFD, the transmitter can detect this situation and avoid unnecessary recovery frames.

As an example of the scenario described above: if receiver 604a submits receiver PLI {CFD=frame10, LKG=frame4} and receiver 604b submits receiver PLI {CFD=frame9, LKG=frame4}, then server 603 would only send one PLI {collective CFD=frame10, collective LKG=frame4} to the transmitter 602. In this case, the transmitter 602 would then generate a recovery frame 10 inter-coded from frame 4 which is transmitted to server 603 and forwarded to both receivers 604a and 604b. Both of the receivers 604a, 604b are able to use the recovery frame to recover the stream at frame 10, as they both have frame 4 available. Note that in this case receiver 604b does not recover frame 9. Instead, receiver 604b recovers the stream at frame 10.

As a further example: if receiver 604a submits receiver PLI {CFD=frame8, LKG=frame5} and receiver 604b submits receiver PLI {CFD=frame9, LKG=frame6}, then server 603 would only send one PLI {collective CFD=frame9, collective LKG=frame5} to the transmitter 602. In this case, the transmitter 602 would then generate a recovery frame 9 inter-coded from frame 5 which is transmitted to server 603 and forwarded to both receivers 604a and 604b. Both of the receiver 604a, 604b are able to use the recovery frame to recover the stream at frame 9, as they both have frame 5 available. Note that in this case, frame 5 is not the "last known good" per se for receiver 604b, but may still be available to receiver 604b in a buffer.

With reference to the above examples, note that the collective CFD determined by the server most generally need only meet the requirement of having a frame number equal to or greater than at least one of the receiver CFDs (i.e. the collective CFD must one of the receiver CFDs or a more recently routed frame). This would still result in a collective PLI which allows that particular receiver to recover. Similarly, the collected LKG determined by the server most generally need only meet the requirement of having a frame number equal to or less than one of the receiver LKGs (i.e. the collective LKG must be one of the receiver LKGs or a less recently routed frame). Here, the term "more recent" is understood to indicate a frame with a higher frame number. Hence, the most recent received frame is the last frame received. Assuming the order of the frame sequence is always preserved, this means that the most recently received frame has the highest frame number of the frames received up to that point in time.

The above examples have been given with reference to frame numbers. It is appreciated however that an explicit frame number is not necessary. All that is needed is an identifier that is connected with each piece of encoded data. For example, that identifier could a packet sequence number (not compressed) or a hash of the entire packet. Note that in the case of a hash, it may be required that the server handling the feedback is the same server as is routing the video stream.

Examples given herein refer to a transmitting device and a server. However, it is understood that the functionality of the server may be implemented in the transmitting device itself. That is, the aggregation steps may be performed at the transmitting device. The transmitting device can be arranged to receive the plurality of receiver PLIs and generate the collective LKG and collective CFD from which it can encode a recovery frame.

Figure 7:
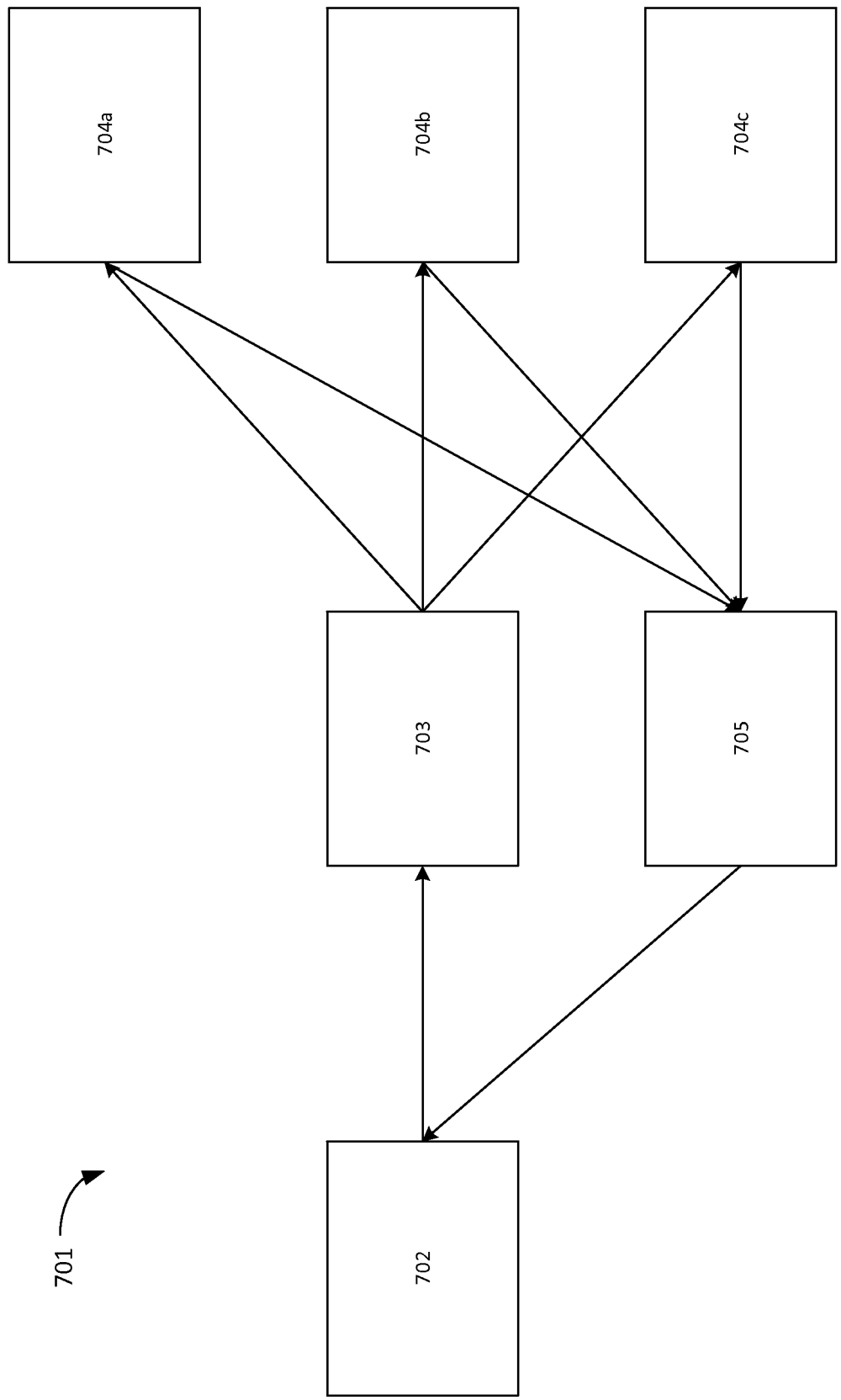
FIG. 7 illustrates an alternative system implementing a conferencing scenario according to the present embodiments.

FIG. 7 illustrates a system 701 implementing a conferencing scenario according to the present embodiments. The system 701 is similar to the system 601 shown in FIG. 6 but the routing and feedback functionalities have been split. In this regard, system 701 similarly comprises a transmitter 702, a server (such as a conferencing server, CS), and a plurality of receivers 704a, 704b, 704c. However, in FIG. 7 the server is a routing server 703 configured to route the video stream from the transmitter 702 to each of the plurality of receivers 704a, 704b, 704c. The system 703 further comprises a feedback server 705 operatively coupled to each of the receivers 704a, 704b, 704c and the transmitter 702. In this split functionality case, the feedback server 705 is configured to provide the feedback functionality and the routing server 703 is configured to provide the routing functionality.

Even more generally than shown in FIG. 7, the server 601 may be implemented using one or more server units. That is, as used herein the term "server" is understood to apply equally to a distributed server as to a single server. In the distributed server case, each server unit may be configured to carry out one or more of the steps described herein. Note that the example given in relation to FIG. 7 is just one possibility. For example, the routing server 703 is shown as a single entity in FIG. 7 but a person skilled in the art recognises that multiple servers or server units may be present between the transmitter and the receiver.

Although the embodiments have been described with reference to frames of a video, as will be familiar to a person skilled in the art, for the purpose of encoding, each frame (F) 101, 102, 103 is divided into portions and each portion may also be subdivided into smaller sub-portions, each portion or sub-portion comprising a plurality of pixels. For example, according to one terminology each frame of a video stream to be encoded is divided into macroblocks (MB) 104 comprising multiple pixels (e.g. each macroblock 104 may be a region of 8×8 pixels. The methods described above also apply generally to portions of a video.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the transmitter may also include an entity (e.g. software) that causes hardware of the transmitter to perform operations, e.g., processors functional blocks, and so on. For example, the transmitter may include a computer-readable medium that may be configured to maintain instructions that cause the transmitter, to perform operations. Additionally, the receiver may also include an entity (e.g. software) that causes hardware of the receiver to perform operations, e.g., processors functional blocks, and so on. For example, the receiver may include a computer-readable medium that may be configured to maintain instructions that cause the transmitter, to perform operations.

One such computer-readable medium is a signal bearing medium configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. A system comprising:
a processor; and
a memory in communication with the processor, the memory comprising executable instructions that, when executed by the processor, cause the processor to control the system to perform functions of:

receiving, from a first receiver via a communication network, a first error message regarding a video received at the first receiver, the first error message indicating a first lost reference frame and a first last decoded frame of the video received at the first receiver;

receiving, from a second receiver via the communication channel, a second error message regarding the video received at the second receiver, the second error message indicating a second lost reference frame and a second last decoded frame of the video received at the second receiver;

determining (i) a target frame of the video based on a relative recency between the first lost reference frame and the second lost reference frame and (ii) a collective last decoded frame based on a relative recency between the first last decoded frame and the second last decoded frame;

obtaining a recovery frame of the video including an encoded version of the target frame that is encoded relative to the collective last decoded frame; and sending, via the communication channel, the recovery frame of the video to at least one of the first and second receivers.

2. The system of claim 1, wherein the instructions, when executed by the processor, further cause the processor to control the system to perform a function of sending the video to the first and second receivers.

3. The system of claim 1, wherein the instructions, when executed by the processor, further cause the processor to control the system to perform a function of receiving the video from a transmitter located remotely from the first and second receivers.

4. The system of claim 3, wherein the instructions, when executed by the processor, further cause the processor to control the system to perform a function of sending the target frame and the collective last decoded frame to the transmitter.

5. The system of claim 4, wherein, for obtaining the recovery frame, the instructions, when executed by the processor, further cause the processor to control the system to perform a function of receiving the recovery frame from the transmitter.

6. The system of claim 4, wherein, for sending the target frame and the collective last decoded frame to the transmitter, the instructions, when executed by the processor, further cause the processor to control the system to perform a function of periodically sending the target frame and the collective last decoded frame to the transmitter.

7. The system of claim 1, wherein, for determining the target frame, the instructions, when executed by the processor, further cause the processor to control the system to perform a function of selecting one of the first and second lost reference frames that has been more recently received by at least one of the first and second receivers.

8. The system of claim 1, wherein, for determining the collective last decoded frame, the instructions, when executed by the processor, further cause the processor to control the system to perform a function of selecting one of the first and second last decoded frames that has been less recently received by at least one of the first and second receivers.

9. A method of providing a recovery frame to a plurality of receivers experiencing an error in a received video, the method comprising:

receiving, from a first receiver via a communication network, a first error message regarding a video received at the first receiver, the first error message indicating a first lost reference frame and a first last decoded frame of the video received at the first receiver;

receiving, from a second receiver via the communication channel, a second error message regarding the video received at the second receiver, the second error message indicating a second lost reference frame and a second last decoded frame of the video received at the second receiver;

determining (i) a target frame of the video based on a relative recency between the first lost reference frame and the second lost reference frame and (ii) a collective last decoded frame based on a relative recency between the first last decoded frame and the second last decoded frame;

obtaining a recovery frame of the video including an encoded version of the target frame that is encoded relative to the collective last decoded frame; and sending, via the communication channel, the recovery frame of the video to at least one of the first and second receivers.

10. The method of claim 9, further comprising sending the video to the first and second receivers.

11. The method of claim 9, further comprising receiving the video from a transmitter located remotely from the first and second receivers.

12. The method of claim 11, further comprising sending the target frame and the collective last decoded frame to the transmitter.

13. The method of claim 12, wherein obtaining the recovery frame comprises receiving the recovery frame from the transmitter.

14. The method of claim 12, wherein sending the target frame and the collective last decoded frame to the transmitter comprises periodically sending the target frame and the collective last decoded frame to the transmitter.

15. The method of claim 9, wherein determining the target frame comprises selecting one of the first and second lost reference frames that has been more recently received by at least one of the first and second receivers.

16. The method of claim 9, wherein determining the collective last decoded frame comprises selecting one of the first and second last decoded frames that has been less recently received by at least one of the first and second receivers.

17. A device comprising:

means for receiving, from a first receiver via a communication network, a first error message regarding a video received at the first receiver, the first error message indicating a first lost reference frame and a first last decoded frame of the video received at the first receiver;

means for receiving, from a second receiver via the communication channel, a second error message regarding the video received at the second receiver, the second error message indicating a second lost reference frame and a second last decoded frame of the video received at the second receiver;

means for determining (i) a target frame of the video based on a relative recency of the first lost reference frame and the second lost reference frame and (ii) a collective last decoded frame based on a relative recency of the first last decoded frame and the second last decoded frame;

means for obtaining a recovery frame of the video including an encoded version of the target frame that is encoded relative to the collective last decoded frame; and means for sending, via the communication channel, the recovery frame of the video to at least one of the first and second receivers.

18. The device of claim 17, further comprising:

means for receiving the video from a transmitter;

means for sending the received video to the first and second receivers;

means for periodically sending the target frame and the collective last decoded frame to the transmitter; and means for receiving the recovery frame from the transmitter.

19. The device of claim 17, wherein the determining means comprises means for selecting, as the target frame, one of the first and second lost reference frames that has been more recently received by at least one of the first and second receivers.

20. The device of claim 17, wherein the determining means comprises means for selecting, as the collective last decoded frame, one of the first and second last decoded frames that has been less recently received by at least one of the first and second receivers.

* * * * *